(12) United States Patent
Dudek (10) Patent No.: US 11,198,562 B2
(45) Date of Patent: Dec. 14, 2021

(54) SUPPLY DEVICE AND METHOD FOR PRODUCING A SUPPLY DEVICE

(71) Applicant: Interroll Holding AG, Sant' Antonino (CH)

(72) Inventor: Siegmund Dudek, Heinsberg (DE)

(73) Assignee: Interroll Holding AG

( * ) Notice: Subject to any disclaimer, the term of this patent is extended or adjusted under 35 U.S.C. 154(b) by 0 days.

(21) Appl. No.: 16/490,064

(22) PCT Filed: Jan. 17, 2018

(86) PCT No.: PCT/EP2018/051098
§ 371 (c)(1),
(2) Date: Aug. 29, 2019

(87) PCT Pub. No.: WO2018/157992
PCT Pub. Date: Sep. 7, 2018

(65) Prior Publication Data
US 2020/0010276 A1    Jan. 9, 2020

(30) Foreign Application Priority Data

Mar. 2, 2017   (DE) .................... 10 2017 002 020.5

(51) Int. Cl.
*B65G 15/62*   (2006.01)
*B65G 23/44*   (2006.01)
(Continued)

(52) U.S. Cl.
CPC ............. *B65G 15/62* (2013.01); *B65G 23/10* (2013.01); *B65G 23/44* (2013.01); *B65G 39/16* (2013.01);
(Continued)

(58) Field of Classification Search
CPC ........ B65G 15/62; B65G 23/10; B65G 23/44; B65G 2201/02; B65G 15/64; B65G 39/071; B65G 23/00
(Continued)

(56) References Cited

U.S. PATENT DOCUMENTS 4,528,878 A * 7/1985 Gerber .................. B25B 11/005
83/100
5,156,261 A * 10/1992 Dorner .................. B65G 23/44
198/816

(Continued)

FOREIGN PATENT DOCUMENTS

CN    206273733 U *  6/2017
GB    2 333 274       7/1999
(Continued)

OTHER PUBLICATIONS

CN210682213U, Derwent Publication 2020-524477 (Year: 2020).*
(Continued)

*Primary Examiner* — Gene O Crawford
*Assistant Examiner* — Lester Rushin, III
(74) *Attorney, Agent, or Firm* — Gerald E. Hespos; Michael J. Porco; Matthew T. Hespos (57) ABSTRACT

A supply device for feeding of goods to be transported to a conveyor device has at least one conveyor belt (9) that extends around two deflection pulleys (4) of the supply device. The at least one conveyor belt (9) has, on its inner side (21), a guide strip (23) arranged approximately along a feed direction (13), and has a bed (11) for guiding the at least one conveyor belt (9) between the two deflection pulleys (4) by a guide groove (19) for the guide strip (23). The bed (11) has a base table (22) and at least one guiding device (20)

(Continued)

attached to the base table (22). The guide groove (19) is formed at least partially by the at least one guiding device (20).

20 Claims, 5 Drawing Sheets (51) Int. Cl.
  *B65G 39/16* (2006.01)
  *B65G 41/00* (2006.01)
  *B65G 23/10* (2006.01)
(52) U.S. Cl.
  CPC ........ *B65G 41/006* (2013.01); *B65G 2201/02* (2013.01); *B65G 2201/04* (2013.01)
(58) Field of Classification Search
  USPC ................................................. 198/835, 841
  See application file for complete search history.

(56) References Cited

U.S. PATENT DOCUMENTS

| | | | |
|---|---|---|---|
| 6,170,649 B1 | 1/2001 | Radandt et al. | |
| 6,945,387 B1* | 9/2005 | Christensen | B65G 17/02 |
| | | | 198/834 |
| 7,584,839 B2* | 9/2009 | Bugge | B65G 15/62 |
| | | | 198/814 |
| 7,832,549 B2* | 11/2010 | Honeycutt | B65G 15/62 |
| | | | 198/831 |
| 8,403,130 B1* | 3/2013 | Mitchell | B65G 15/64 |
| | | | 198/835 |
| 2015/0143676 A1* | 5/2015 | Kanayama | B21D 39/032 |
| | | | 24/697.2 |

FOREIGN PATENT DOCUMENTS

| | | | |
|---|---|---|---|
| GB | 2333274 A * | 7/1999 | ............. B65G 23/44 |
| GB | 2 440 035 | 1/2008 | |
| JP | 59-43412 | 3/1984 | |
| JP | 06-100139 | 4/1994 | |
| WO | 99/62795 | 12/1999 | |

OTHER PUBLICATIONS

English language translation of German Office Action dated Jun. 21, 2019.
International Search Report dated Apr. 4, 2018.
German Office Action dated Jun. 21, 2019.
European Office Action dated Oct. 4, 2021.

* cited by examiner

SUPPLY DEVICE AND METHOD FOR PRODUCING A SUPPLY DEVICE

BACKGROUND

Field of the Invention

The invention relates to a supply device for lateral feeding or discharging of goods to be transported to a conveyor device, and to a method for providing a supply device for lateral feeding or discharging of goods to be transported to a conveyor device.

Related Art

The supply device of this type is used to supply goods to be transported laterally to a conveyor device. A known supply device has at least one conveyor belt that extends around two deflection pulleys, and a bed is arranged between the two deflection pulleys for guiding and/or supporting the at least one conveyor belt. The bed usually is formed in one piece with a guide groove formed therein for the guiding of the at least one conveyor belt, for example made of a plastic block with at least one guide groove milled into the bed. In some cases, this may come with several drawbacks, e.g. in that a blank for the bed has rather large dimensions, and thus handling a production of the bed is complex and elaborate. In addition, when using multiple conveyor belts, there is a risk that the entire bed must be replaced in the case that only one or few of the guide grooves are worn.

To avoid these drawbacks, the object of the present invention is that of providing an improved supply device which particularly reduces manufacturing efforts.

SUMMARY

One aspect relates to a supply device for lateral feeding of goods to be transported to a conveyor device, having at least one conveyor belt that extends around two deflection pulleys of the supply device. The at least one conveyor belt comprises, on its inner side, a guide strip arranged approximately along a feed direction. The supply device also has a bed for guiding the at least one conveyor belt between the two deflection pulleys. The bed has a guide groove for the guide strip. The bed comprises a base table and at least one guiding device attached to the base table, and the guide groove is formed at least partially by the at least one guiding device.

The supply device can be formed as part of a supply conveyor device on which goods to be transported are conveyed to a conveyor device approximately along the feed direction. The goods to be transported can be conveyed on the conveyor device approximately along a conveying direction. The supply device can likewise be configured as a discharge device, by means of which goods to be transported can be discharged laterally away from the conveyor device.

One of the two deflection pulleys may be a drive pulley, and the other one of the two deflection pulleys may be at least one end pulley.

The drive pulley can be configured on a first end of the supply device, and the at least one end pulley can be configured on a second end of the supply device. The second end can be arranged substantially opposite the first end with respect to the feed direction.

The bed may be arranged between the drive pulley and the at least one end pulley.

Each of the end pulleys can be associated with one of the conveyor belts that extends around the drive pulley and the respective end pulley and can be driven by means of the drive pulley.

The at least one guide groove may be formed at least partially in the drive pulley, in the bed and in the at least one end pulley.

In particular, a lateral guiding for the respective conveyor belt can be provided by means of the at least one guide groove for the guide strip.

In particular, the lateral guiding of the respective conveyor belt is made possible in that the guide strip engages into the respective guide groove.

An advantage of the present invention lies with a simplified production of the bed. More particularly, the bed comprises multiple individual parts, compared to the bed usually contained in the above-mentioned known supply device. These individual parts can be easier to produce and assemble than a conventional bed, which, as mentioned, consists of one material block that needs to be processed elaborately and that is more complex in handling. Furthermore, in the event that one or multiple of the guiding devices are worn, the respectively worn guiding device can be replaced; replacing the entire bed is not necessary, and replacing only the worn bed is more cost-effective compared with the usually employed one-piece bed.

At least one lateral surface or at least one lateral wall of the guide groove can be provided and/or the guide groove can be delimited at least on one side by means of the guiding device. For example, each lateral surface or lateral wall can be formed by another guiding device, in particular of substantially the same construction.

The guide groove can be widened on at least one of its ends. For this purpose, in particular the cross-section of the guide groove can be wider on at least one end. Wear on the guide strip and/or to the element(s) forming the guide groove can be reduced thereby, in particular while the guide strip enters the guide groove and/or while the guide strip exits the guide groove.

For the widening of the guide groove, the at least one lateral surface or the at least one lateral wall of the guide groove can be inclined.

A base of the guide groove can be provided by the base table.

Advantageously, the at least one guiding device is attached to the base table in such a way that the guide groove is oriented approximately along the feed direction. As a result, a guiding, in particular a lateral guiding, of the respective conveyor belt is made possible.

At least two guiding devices may be arranged approximately parallel next to one another on the base table and are spaced from one another in such a way that the guide groove is formed between the guiding devices by means of a spacing oriented approximately perpendicular to the feed direction.

In other words, a first lateral surface of the guide groove can be provided by means of a first one of the guiding devices, and a second lateral surface of the guide groove can be provided by means of a second one of the guiding devices. In this respect, the first and the second guiding device can be configured to be spaced from one another, viewed approximately transversely to the feed direction.

Alternatively, or additionally, the guide groove can be formed entirely on one of the guiding devices. Thus, merely one single guiding device has to be replaced per worn guide groove, for example.

A cross-section of the guide groove can be adapted to a cross-section of the guide strip. Thus, in the case that the guide strip and the guide groove contact one another, a substantially uniform contact and thus a substantially uniform guiding is made possible. In addition, excessive wear on the guide strip and/or the guide groove to be traced back to an only partial contact between guide strip and guide groove can be reduced and a substantially uniform wear of guide strip and/or guide groove can be achieved. For example, if a guide strip that has a substantially tapered cross-section is used, the guide groove for this guide strip is also configured to have a substantially tapered cross-section, in particular with a substantially equal tapering angle.

The guide groove can be formed substantially complementary to the guide strip.

Advantageously, the base table is substantially plate shaped and comprises at least one receptacle for receiving at least one fastening device formed on the guiding device. Thus, the base table is formed of a component that is simple and inexpensive to manufacture. For example, the base table is formed from a metal, in particular steel, or from plastic material, or from a composite material.

At least one reinforcement member can be provided at an underside of the base table facing away from the guiding device, for the stiffening of the base table. The reinforcement member can be formed as a C-shaped profile, for example. The C-shaped profile can be formed from a metal, in particular steel, or from a plastics material, or from a composite material.

The at least one attachment device can be formed integrally with the at least one guiding device. As a result, the number of components for the bed can be reduced despite the above-mentioned advantageous multi-part configuration of the bed.

Multiple attachment devices can be formed on each guiding device at regular intervals.

Multiple receptacles can be formed on each guiding device at regular intervals.

The intervals of the receptacles may be adapted to the intervals of the attachment devices. As a result, a production of the at least one guiding device and of the base table and/or an attachment of the at least one guiding device to the base table is simplified.

When mounting the guiding device on the base table, a mutual check of these components as to a respectively achieved production accuracy is made possible in a simple manner since a deviation of the receptacles from the attachment devices becomes apparent and thus can be checked.

The guiding device can be attached to the base table in a force-fit and/or form-fit manner. Thus, simple alignment and attachment of the guiding device to the base table is made possible.

The guiding device may be attached to the base table in a form-fit manner. In this case, a mostly separate force-fit connection device might not be required anymore.

The at least one guiding device can be formed as an essentially U-shaped profile element.

The essentially U-shaped profile element may be formed from a metal, in particular steel, or from a plastics material, or from a composite material, for example.

The essentially U-shaped profile element may be produced from a cold-rolled and/or cold-formed steel. Cold-rolled steel has an especially smooth and strengthened surface which, on the one hand, can ensure particularly low friction between the goods to be transported and the guiding device, and, on the other hand, low wear on the goods to be transported and/or the guiding device.

The essentially U-shaped profile element can be produced by means of bending, extrusion, or welding.

The guide groove may be formed at a central web of the essentially U-shaped profile element. Alternatively, the guide groove can at least partially be formed on a flange of the essentially U-shaped profile element.

The guide groove can be formed entirely on the central web of the essentially U-shaped profile element, for example at exactly one essentially U-shaped profile element per conveyor belt.

Alternatively, or additionally, the guide groove can be formed by flanges of two adjacently arranged, essentially U-shaped profile elements. In other words, a lateral surface of the guide groove can be formed by one of the two essentially U-shaped profile elements, viewed in the feed direction, and another lateral surface of the guide groove can be formed by the other one of the two essentially U-shaped profile elements that is arranged opposite the first essentially U-shaped profile element, viewed approximately transversally to the feed direction.

Virtually as a combination of the two above-mentioned features, the guide groove can be formed entirely on the central web of the essentially U-shaped profile element, and a lateral surface of another guide groove can be formed on at least one flange of the same essentially U-shaped profile element.

The at least one receptacle may be formed as a slot in the base table. Thus, the receptacle can be produced in simple ways and manners.

An orientation of the at least one receptacle is adapted to an orientation of the at least one attachment device if the guiding device is applied on to the base table.

The at least one attachment deice may be configured as a foot member that projects downward from the guiding device through the slot, in particular if the guiding device is applied on to the base table. Thus, the attachment device of the guiding device can be brought into the receptacle of the base table in a simple manner.

The at least one slot may be oriented approximately along the feed direction.

The foot member may project from a flange of the essentially U-shaped profile element at the face side.

The respective foot member may lie approximately in one common plane with the respective flange, at least during the production thereof. As a result, a production of the essentially U-shaped profile element with the at least one foot member is simplified. In particular, the essentially U-shaped profile element and/or an essentially sheet-shaped precursor thereof, with the at least one foot member can be produced by cropping and forming, e.g. laser-beam cutting, water jet cutting and/or a roll forming process.

The at least one foot member can be produced by laser cutting or water jet cutting independently of the manufacturing method of the essentially U-shaped profile element.

The at least one foot member may comprise a fixing section that is connected with the respective flange by means of a web of the foot member. In this respect, the fixing section can be spaced from the flange by means of the web.

A length of the web may be dimensioned such that the fixing section adjoining the web projects from the respective slot if the respective foot member has been inserted through the respective slot.

The length of the web may extend from an upper side of the base table that faces the guiding device, to an underside of the base table that faces away from the guiding device, if the guiding device is applied on to or attached to the base table. In other words, the length of the web advantageously corresponds to at least a thickness and/or substantially a thickness of the base table.

The web can, at least in sections, be formed narrower that the fixing section.

A width of the web, at least in sections, may be narrower than a width of the fixing section. In this regard, the respective width is defined as an enlargement oriented approximately along the feed direction when the guiding device is applied on to the base table.

The fixing section may be symmetrical to both sides of the web.

Alternatively, the fixing section can exclusively be formed at one side of the web. Thus, a freedom in the design of the fixing section is made possible.

A fixing section that projects out of the respective slot and thus is intended for attaching the guiding device may be rotatable in such a manner that an abutment section of the fixing section at least partially bears against an underside of the base table facing away from guiding device. Thus, the guiding device is attached to the base table in a form-fit and/or force-fit manner, and a risk that the guiding device moves out of the base can be reduced. Thus, the fixing section is clamped against the base table in a form-fit or force-fit manner.

The fixing section can be rotated up to approximately 90°, preferably by approximately 45°.

When rotated, the fixing section can be permanently and/or plastically deformed.

An abutment section of the fixing section may be approximately parallel to an end edge of the respective flange of the essentially U-shaped profile element.

Alternatively or additionally, an abutment section of the fixing section can be formed at a skew angle with respect to the end edge in such a way that a distance of a distal section of the abutment section that has a larger distance from the web, to an end edge of the respective flange is larger than a distance from a proximal section of the abutment section that has a smaller distance from the web. Thus, in the fixing section projecting from the slot, a deviation in thickness of the base table and/or a length deviation of the web can be compensated—after inserting the foot member through the slot—and a rotation of the fixing section is possible despite these deviations.

A shortening of the web can be caused by rotating the fixing section projecting from the slot, for example by means of a torsion of the web. Thus, contact points between the abutment section and the end edge can result by the rotation of the fixing section. Thus, the attachment of the guiding device to the base table in a manner substantially free from play at least in the direction of the thickness of the base table is possible.

A widening may be formed in the vicinity of the web, in particular approximately centrally on the slot. Thus, in the fixing section symmetrically formed to the web, a web of the foot member is rotatable in the widening upon rotation of the fixing section of the respective foot member, and a risk of a tearing of the respective foot member can be reduced, in particular a tearing of the fixing section on the web. Without the widening, the web would be prevented from the rotary movement by the slot, and the risk of a tearing of the foot member would be higher, in particular a tearing of the fixing section on the web. Thus, the fixing section can be rotatable up to approximately 270° without tearing, depending upon a material employed for the web.

The widening advantageously can be produced by punching or drilling or milling or laser cutting or water jet cutting.

The widening can be formed as an approximately round recess.

One aspect of the invention relates to a method for providing a supply device for feeding of goods to be transported to a conveyor device, comprising the steps of:

providing at least one conveyor belt having a guide strip approximately arranged along a feed direction in such a way that the conveyor belt extends around two deflection pulleys of the supply device, and providing a bed for guiding the at least one conveyor belt between the two deflection pulleys by means of a guide groove for the guide strip, wherein the bed comprises a base table and at least one guiding device attached to the base table, and wherein the guide groove is at least partially formed by the at least one guiding device.

The advantages of the method for providing the supply device similarly result from the features and advantages specified for the above-mentioned supply device.

At least one foot member of the guiding device may be inserted through a substantially slot-shaped receptacle in the base table, and the foot member inserted through the receptacle is rotated in such a way that the guiding device is attached to the base table in a form-fit and/or force-fit manner.

The guiding device can be formed as an essentially U-shaped profile element.

The essentially U-shaped profile element can be produced from steel, in particular from cold-rolled steel, for example.

The widening of the ends of the essentially U-shaped profile element can be achieved by cold forming, in particular deep drawing. Thus, a simplified and inexpensive method for providing the guiding device, in particular the essentially U-shaped profile element, can be implemented.

Exemplary embodiments of the supply device according to the invention are hereinafter explained in greater detail based upon the drawings.

DETAILED DESCRIPTION

Figure 1:
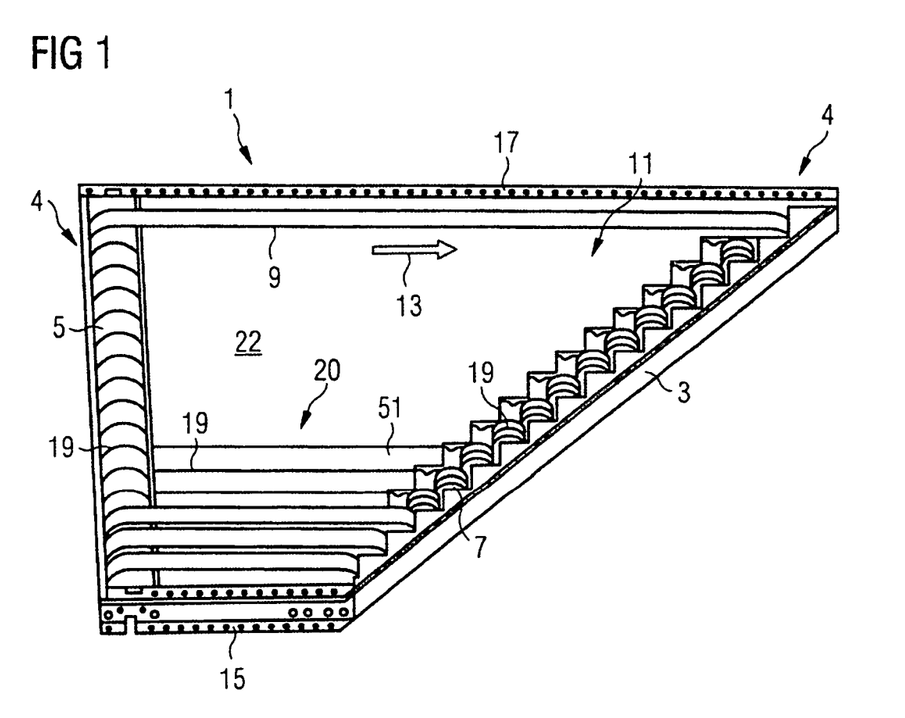
FIG. 1 is a spatial plan view of a supply device according to a first exemplary embodiment.

FIG. 1 shows a supply device 1 with a frame 3 and deflection pulleys 4, which, in the exemplary embodiment shown, are configured as a drive pulley 5 on the one side, and as a plurality of end pulleys 7 on the other side. In this embodiment, there are a total of 16 end pulleys 7. The supply device 1 comprises a base table 22 with two lateral end sections 15, 17. The axis of the drive pulley 5 is arranged substantially perpendicularly to these end sections 15, 17. The multiple end pulleys 7 are respectively associated with one conveyor belt 9—thus, in this exemplary embodiment, the supply device 1 comprises sixteen conveyor belts 9. A bed 11 is arranged between the drive pulley 5 and the end pulleys 7. Cover metal plates are arranged on the end pulleys 7, as a finger protection, attached to the frame 3. The supply device 1 for in particular lateral feeding of goods to be transported to a conveyor device can alternatively be used as a discharge device for discharging or guiding goods to be transported away from a conveyor device.

The conveyor belts 9 are arranged approximately along a feed direction 13 indicated by an arrow, and approximately parallel next to one another. In the case that the supply device 1 is used as a discharge device, the feed direction 13 corresponds to a discharge direction, in particular oriented in the opposite direction. The feed direction 13 faces away from the drive pulley 5 towards the end pulleys 7. In this representation, some of the conveyor belts 9 are omitted for a better illustration of the structure of the supply device 1, and the bed 11 is likewise not entirely shown. A belt length of the respective conveyor belts 9 increases from a first lateral end section 15 of the supply device 1 to a second lateral end section 17 of the supply device 1 transversally to the feed direction 13.

Respectively one guide groove 19 associated with each of the conveyor belts 9 is formed on the drive pulley 5, the bed 11 and the end pulleys 7, which groove serves for the lateral guiding of the respective conveyor belt 9. The bed 11 comprises a guiding device 20, on which the respective guide groove 19 is at least partially formed. As hereinafter indicated with reference to FIG. 2, a guide strip 23 respectively formed approximately centrally at an inner side 21 of the conveyor belt engages into the guide groove 19 that corresponds in position to the guide strip 23. The guide strip 23 is formed approximately along the feed direction 13. A guiding device 20 is attached to a base table 22 of the bed 11. The base table 22 can be formed essentially plate-shaped. In this exemplary embodiment, the base table 22 can be formed from steel.

The supply device 1 provides a feed conveyor surface for goods to be transported, on which the goods to be transported can be conveyed on the conveyor belts 9 in the feed direction 13. The feed conveyor surface is provided by the upper outer sides 43 of the conveyor belts 9. The supply device 1 can be formed as a table, for example, wherein the feed conveyor surface is formed as a table surface.

Figure 2:
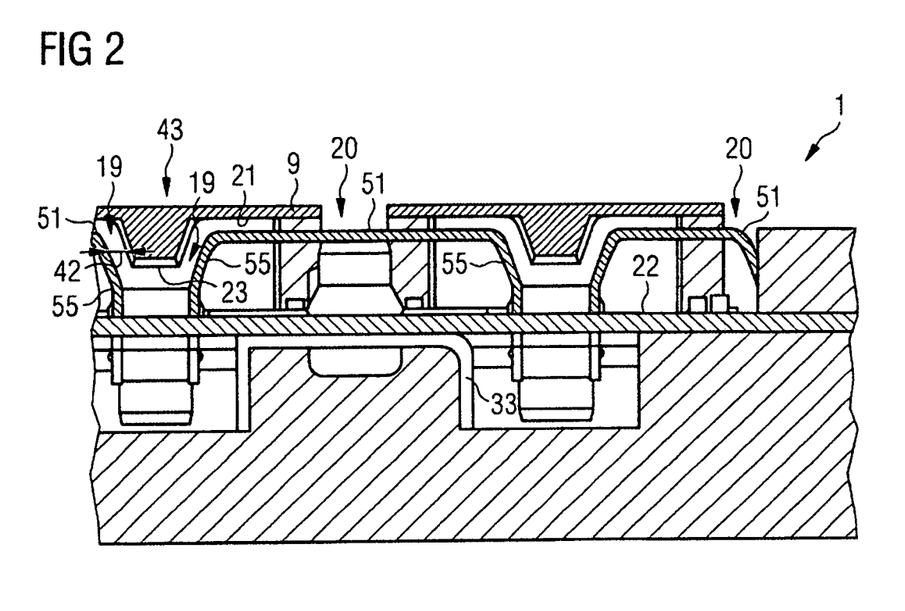
FIG. 2 is a partial sectional view, enlarged with respect to FIG. 1, of a front view of the supply device with viewing direction towards the end pulleys, with a guiding device according to a first exemplary embodiment.

In the partial cross-section shown in FIG. 2, which is enlarged with respect to FIG. 1, of a front view of the supply device 1 in the viewing direction towards the end pulleys 7, the guide strips 23 mentioned above in FIG. 1 can be discerned, which are formed on each of the conveyor belts 9 approximately centrally on the inner side 21 thereof approximately along the feed direction 13. The guide strips 23 are formed as tapered strips here.

At least one reinforcement member 33 formed as a C-profile is provided at an underside 31 of the base table 22 facing away from the guiding device 20, for the stiffening of the base table 22.

For the lateral guiding of the respective conveyor belt 9, the guide strip 23 thereof engages into a guide groove 19 associated with the respective conveyor belt 9. The guide groove 19 can be formed in multiple parts and comprise multiple sections. The guide groove 19 can, in sections, be formed in the drive pulley 5, the bed 11 and/or the end pulley 7 associated with the respective conveyor belt 9. The arrangement of the guide groove 19 can substantially correspond to the arrangement of the associated guide strip 23, in particular with respect to a direction approximately transversally to the feed direction 13. The respective guide groove 19 can be formed as a tapered groove and have a cross-section (in a plane perpendicular to the feed direction 13), which is formed substantially complementary to the guide strip 23 formed as the tapered strip.

A lateral clearance 42 between the respective guide strip 23 and the associated guide groove 19 in the drive pulley 5 can be smaller than in the bed 11, for example, enabling a lateral guiding of the respective conveyor belt 9 to be provided by means of the associated guide groove 19 in the drive pulley 5. The lateral clearance 42 is configured approximately parallel to a plane of the respective conveyor belt 9, e.g. a plane of an upper outer side 43 of the respective conveyor belt 9, and substantially perpendicular to the feed direction 13. The lateral guiding of the respective conveyor belt 9 can thus effectively be provided on a shorter engagement path between the respective guide strip 23 and the associated guide groove 19 than would be the case e.g. with the lateral guiding of the respective conveyor belt 9 in the bed 11. Purely as a result of the reduced engagement path, this can entail reduced friction and thus reduced wear on the respective guide strip 23 and/or the associated guide groove 19.

The respective upper outer sides 43 of the conveyor belts 9 lie in one common plane here, by which the feed conveyor surface can be provided.

The guiding device 20 is formed as an essentially U-shaped profile element 51, wherein, in a first exemplary embodiment shown here, each conveyor belt 9 is guided in two guiding devices 20. The essentially U-shaped profile element 51 can be made from steel, in particular cold rolled steel. Cold-rolled steel has a particularly smooth and strengthened surface, which, on the one hand, can ensure particularly low friction between the conveyor belt 9 and the guiding device 20 and, on the other hand, low wear on the conveyor belt 9 and/or the guiding device 20.

In this case, the guide groove is formed by the flanges of two adjacently arranged, essentially U-shaped profile elements. Viewed in the feed direction 13, which faces into the sheet plane, a lateral surface of the guide groove 19 can be formed by one of the two essentially U-shaped profile elements 51. Another lateral surface of the guide groove 19 can be formed by the other one of two essentially U-shaped profile elements 51, which can be arranged opposite the first essentially U-shaped profile element 51 viewed approximately transversally to the feed direction 13. The two flanges 55 of an essentially U-shaped profile element 51 delimit two different parallelly-formed guide grooves 19 spaced from one another via the essentially U-shaped profile element 51.

Figure 3:
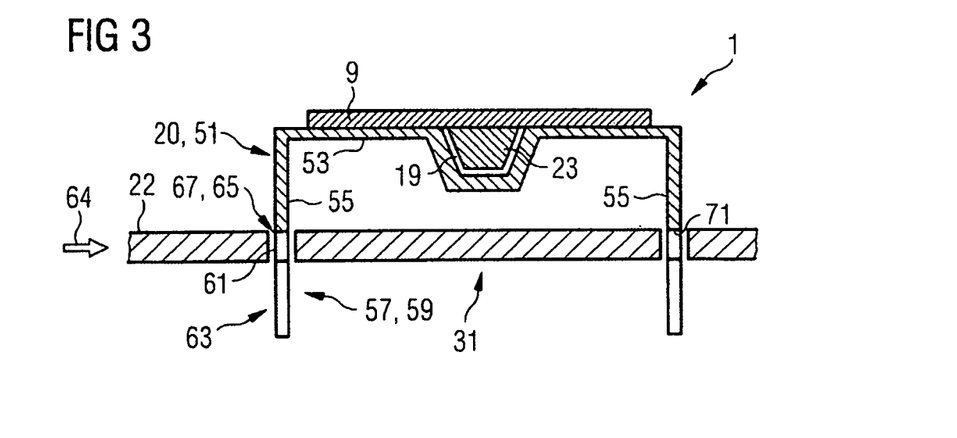
FIG. 3 is a partial sectional view, enlarged with respect to FIG. 1, of a front view of the supply device with viewing direction towards the end pulleys, with a guiding device according to a second exemplary embodiment.

Similar to FIG. 2, FIG. 3 shows a partial cross-sectional view, enlarged with respect to FIG. 1, of a front view of the supply device 1 in viewing direction of the end pulleys. By contrast with FIG. 2, a guiding device 20 according to a second exemplary embodiment is shown.

Each conveyor belt 9 is associated with exactly one guiding device 20 on which the guide groove 19 is entirely formed. Similar to FIG. 2, the guiding device 20 is formed as an essentially U-shaped profile element 51. The guide groove 19 is formed on a central web 53 of the essentially U-shaped profile element 51.

At least one flange 55 of the essentially U-shaped profile element 51 can be oriented approximately perpendicularly with respect to the base table 22, as illustrated. Alternatively, or additionally, the at least one flange 55 of the essentially U-shaped profile element 51 can be oriented with respect to the base table 22 at an angle different from approximately 90°, similar to the essentially U-shaped profile element 51 according to the first exemplary embodiment shown in FIG. 2.

The guiding device 20 shown in FIG. 2 can comprise at least one flange 55 which can be oriented approximately perpendicularly to the base table 22, similar to the essentially U-shaped profile element 51 according to the second exemplary embodiment shown in FIG. 3, as an alternative to the flange 55 of the essentially U-shaped profile element 51, which is shown there and which can be oriented with respect to the base table 22 at an angle different from approximately 90°. As a result, guide grooves 19 having substantially vertical lateral surfaces or lateral walls can be provided.

The conveyor belt 9 is shown in FIG. 3 to be bearing on the guiding device 20, in particular on the essentially U-shaped profile element 51, but can be spaced from it, as shown in FIG. 2.

Alternatively, or additionally, the conveyor belt 9 shown in FIG. 2 can bear on the guiding device 20, in particular on the essentially U-shaped profile element 51.

An attachment device 57 is formed on the guiding device 20 of the exemplary embodiments shown in FIGS. 2 and 3. The attachment device 57 is formed, in accordance with a first exemplary embodiment, as a foot member 59, which comprises a web 61 and a fixing section 63. The foot member 59 is connected to the guiding device 20, in particular to the flange 55 of the essentially U-shaped profile element 51, by means of the web 61.

In FIGS. 2 and 3, the attachment device 57 is not shown to be rotated for the attachment of the guiding device 20 to the base table 22 and will be explained in detail in the following figures, in particular in FIG. 4.

Figure 4:
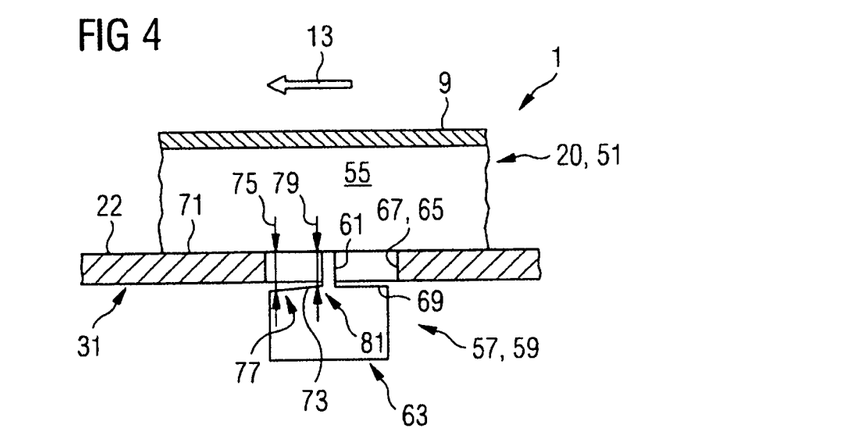
FIG. 4 is a cut lateral view of the front view shown in FIG. 3, with an attachment device according to a first exemplary embodiment.

FIG. 4 shows a sectional side view of the guiding device 20 with the attachment device 57. The side view is, for example, viewed in the direction of the arrow 64 shown in FIG. 3.

The attachment device 57 can be formed integrally with the guiding device 20, the foot member 59 can, in particular, be integrally connected with the flange 55, as shown in the exemplary embodiments.

As can clearly be discerned in the side view, the web 61, by means of which the foot member 59 is connected to the flange 55, is narrower than the fixing section 63 when viewed approximately in the feed direction 13.

A receptacle 65 is provided in the base table 22, which is formed as a slot 67 in the feed direction 13. When applying the guiding device 20 on to the base table 22, the attachment device 57 reaches through the receptacle 65, that is the foot member 59 in particular reaches through the slot 67. The web 61 is arranged in the slot 67 here, and the fixing section 63 projects through the slot 67 and protrudes from an underside 31 of the base table 22 facing away from the guiding device 20.

The abutment sections 69, 73 of the fixing section 63 are formed at a skew angle with respect to an end edge 71 of the respective flange 55 of the essentially U-shaped profile element 51 in such a way, that a distance 75 from a distal section 77, located further away from the web 61, of the abutment sections 69, 73 to the end edge 71 of the respective flange 55 is larger than a distance 79 from a proximal section 81 of the respective abutment section 69, 73 located closer to the web 61. The two abutment sections 69, 73 are thus formed as two approximately mirror-symmetric sections, in particular surfaces, of the fixing section 63 that face the flange 55.

Figure 5:
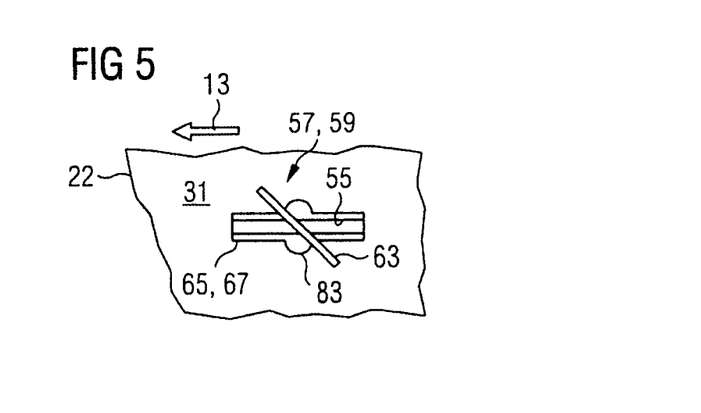
FIG. 5 is a lower view of the base table with a receptacle.

In a lower view of the base table 22, on its underside 31 in FIG. 5, the receptacle 65 formed as a slot 67 is shown, through which a foot member 59, in particular a fixing section 63, projects.

For the form-fit and/or force-fit attachment of the guiding device 20, in particular of the essentially U-shaped profile element 51, to the base table 22, the fixing section 63 is rotated in such a way that the abutment sections 69, 73 at least partially but against the underside 31. The fixing section is rotated by approximately 45° here.

In the vicinity of the web 61, the slot 67 can comprise a widening 83. In this case, the widening 83 is formed substantially centrally on the slot 67. When rotating the fixing section 63, the web 61 can therefore co-rotate in a manner not disturbed by the slot 67, whereby a risk of tearing of the web 61 can be reduced.

Figure 6:
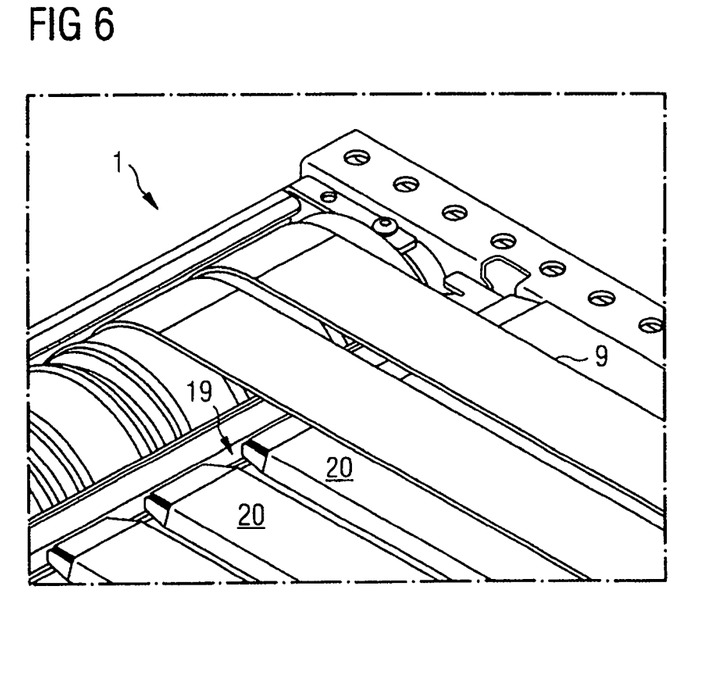
FIG. 6 is a spatial plan view of a detail of a supply device according to FIG. 1.

FIG. 6 shows a spatial plan view of a detail of a supply device 1 in accordance with FIG. 1. The guide grooves 19 formed by the guiding devices 20 shown here are illustrated as being widened at their end sections. In order to widen the respective guide groove 19, the respective lateral surface or the respective lateral wall of the guide groove 19 is inclined, in particular towards the side facing away from the guide strip 23 (not shown), which, for a better understanding, is also shown in the front view of FIG. 7.

In this respect, the essentially U-shaped profile element 51 which provides the guiding device 20 can e.g. be bent away from the respective guide groove 19 at least one end (viewed in the feed direction 1) in such a way that the cross-section of the guide groove 19 is formed to be wider at this end. At this widened point, the cross-section of the guide groove 19 can be formed to be wider by at least approximately 5%, preferably by at least approximately 10%, particularly preferably by at least approximately 20%. The widening of the ends of the essentially U-shaped profile elements 51 can be achieved by means of cold forming, in particular by means of deep drawing, for example.

As a result, wear on the respective guide strip 23 and/or to the guiding devices 20 forming the respective guide groove 19 can be reduced, in particular when the guide strip 23 enters the guide groove 19 and/or when the guide strip 23 exits the guide groove 19. A contact of a ridge present e.g. on the end section, with the guide strip can be prevented thereby.

Figure 7:
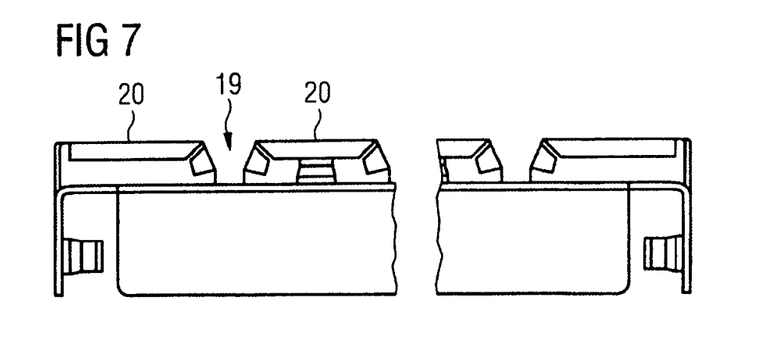
FIG. 7 is a front view of the supply device shown in FIG. 6.

In addition, as shown in FIGS. 6 and 7, a connection of the lateral surfaces or of the lateral walls can be chamfered, in particular towards a side facing away from the conveyor belt 9. In the essentially U-shaped profile element, the connection of the lateral surfaces or of the lateral walls corresponds to the central web of the essentially U-shaped profile element.

Figure 8A:
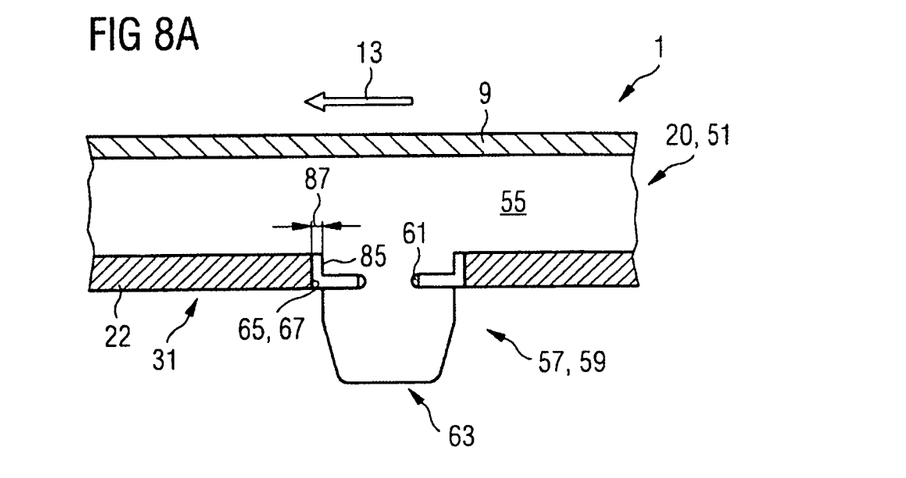
FIGS. 8A and 8B are sectional lateral views of the front view show in FIG. 3, with an attachment device according to a second exemplary embodiment.
Figure 8B:
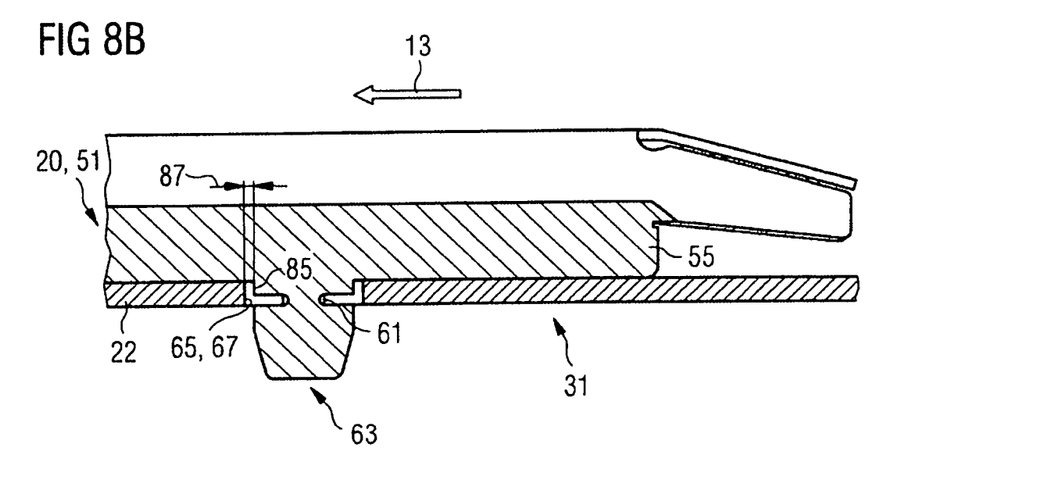

According to a second exemplary embodiment, as shown in FIGS. 8A and 8B, as an alternative or in addition to the first exemplary embodiment shown in FIG. 4, the attachment device 57 can be formed with a centering device 85.

The features described above in relation to the first exemplary embodiment shown in FIG. 4 generally likewise apply to the second exemplary embodiment of the attachment device 57 shown here. Hereinafter, the differences between the second exemplary embodiment and the first exemplary embodiment of the attachment device 57 are mainly described.

The centering device 85 advantageously is formed approximately centrally around the web 61 of the foot member 59. The centering device 85 is formed as a guide trunnion here, for example.

The centering device 85 in particular can be formed as a widening of the web 61. In other words, the centering device 85 can at least partially widen the web 61 from the end edge 71 of the flange 55 in the direction of the underside 31 of the base table 22.

Advantageously, an outer extension of the centering device 85 is slightly smaller, i.e. e.g. by approximately 5% to 40%, preferably approximately 5% to approximately 20%, than an inner extension of the receptacle 65. In particular, an approximately uniform distance 87 between the receptacle 65 and the centering device 85 is formed in an approximately central position of the centering device 85 in the receptacle 65.

Thus, an effective reduction of a clearance between the guiding device 20 and the base table 22, in particular between the attachment device 57 and the receptacle 65, can be achieved in a simple manner when mounting the guiding device 20 on the base table 22.

In this way, the clearance between the guiding device 20 and the base table 22 can be reduced approximately in and/or counter to the feed direction 13. Alternatively, or additionally, the clearance between the guiding device 20 and the base table 22 approximately perpendicular to the feed direction 13 can be reduced approximately in one plane of the base table 22.

Furthermore, the guiding device 20 can thus be mounted on the base table 22 in a more precise manner, a predetermined position of the guiding device 20 with respect to the base table 22, in particular approximately in and/or counter to the feed direction 13 can be observed in a more precise manner.

Thus, a tolerance in a predetermined position of the deflection pulleys 4 with respect to the base table 22, in particular approximately in and/or against the feed direction 13, can advantageously be designed with greater tolerances.

To sum up, the web 61 which is widened by means of the centering device 85 can not only lead to a stabilization of the foot member 59, but also to a reduction of inaccuracy in the mounting of the guiding device 20 on the base table 22 and/or in the position of the guiding device 20 with respect to the base table 22.

LIST OF REFERENCE CHARACTERS 1 supply device
3 frame
4 deflection pulley
5 drive pulley
7 end pulley
9 conveyer belt
11 bed
13 feed direction
15 first lateral end section of supply device
17 second lateral end section of the supply device
19 guide groove
20 guiding device
21 inner side of conveyor belt
22 base table
23 guide strip
31 underside
33 reinforcement member
42 lateral clearance of the guide strip of the guide groove
43 upper outer side of conveyor belt
51 essentially U-shaped profile element
53 central web of essentially U-shaped profile element
55 flange of essentially U-shaped profile element
57 attachment device
59 foot member
61 web of the foot member
63 fixing section of the foot member
65 receptacle
67 slot
69 first abutment section of fixing section
71 end edge of flange
73 second abutment section of fixing section
75 distance from web to end edge on distal section
77 distal section of second abutment section
79 distance from web to end edge on proximal section
81 proximal section of second abutment section
83 widening
85 centering device
87 distance

The invention claimed is:

1. A supply device for feeding of goods to be transported to a conveyor device, comprising:
at least one conveyor belt (9) that extends around two deflection pulleys (4) of the supply device, the at least one conveyor belt (9) has an inner side (21) with a guide strip (23) approximately arranged along a feed direction (13), and
a bed (11) having a guide groove (19) receiving the guide strip (23) for guiding the at least one conveyor belt (9) between the two deflection pulleys (4), wherein:
the bed (11) comprises a base table (22) and at least two guiding devices (20) attached to the base table (22), the at least two guiding devices (20) being arranged approximately parallel to one another on the base table (22) and being spaced from one another so that the guide groove (19) is formed by a spacing between the at least two guiding devices (20), the spacing being oriented approximately perpendicular to the feed direction (13) so that the guide groove (19) is oriented approximately along the feed direction (13); and
the base table (22) is substantially plate-shaped and comprises at least one receptacle (65) for receiving at least one attachment device (57) formed on each of the guiding devices (20).

2. The supply device of claim 1, wherein each of the at least two guiding devices (20) is an essentially U-shaped profile element.

3. The supply device of claim 1, wherein the at least one receptacle (65) is substantially formed as a slot (67) in the base table (22), and the at least one attachment device (57) is formed as a foot member (59) projecting downward from each of the guiding devices (20) through the at last one slot (67), and
wherein the at least one slot (67) is oriented approximately along the feed direction (13) and the foot member (59) protrudes from a flange (55) of the essentially U-shaped profile element (51) at the face side.

4. The supply device of claim 3, wherein the attachment device (57) is formed with a centering device (85).

5. The supply device of claim 3, wherein the at least one foot member (59) comprises a fixing section (63) that is connected to the respective flange (55) by means of a web (61) of the foot member (59), and wherein a length of the web (61) is dimensioned in such a way that the fixing section (63) adjoining the web (61) projects out of the respective slot (67) when the respective foot member (59) is inserted through the respective slot (67), and
wherein the web (61) is, at least in sections, formed narrower than the fixing section (63).

6. The supply device of claim 5, wherein the fixing section (63) that projects out of the respective slot (67) is rotatable, for attaching the respective guiding device (20), in such a way that at least one abutment section (69, 73) of the fixing section (63) abuts on an underside (31) of the base table (22) facing away from the respective guiding device (20) for clamping the fixing section (63) against the base table (22) in a form-fit and/or force-fit manner.

7. The supply device of claim 3, wherein a widening (83) is formed approximately centrally on the slot (67).

8. A supply device for feeding of goods to be transported to a conveyor device, comprising:
at least one conveyor belt (9) that extends around two deflection pulleys (4) of the supply device, the at least one conveyor belt (9) has an inner side (21) with a guide strip (23) approximately arranged along a feed direction (13), and
a bed (11) having a guide groove (19) receiving the guide strip (23) for guiding the at least one conveyor belt (9) between the two deflection pulleys (4), wherein:
the bed (11) comprises a base table (22) and at least two guiding devices (20) attached to the base table (22), the at least two guiding devices (20) being arranged approximately parallel to one another on the base table (22) and being spaced from one another so that the guide groove (19) is formed by a spacing between the at least two guiding devices (20), the spacing being oriented approximately perpendicular to the feed direction (13) so that the guide groove (19) is oriented approximately along the feed direction (13); and
the at least two guiding devices (20) are attached to the base table (22) in a form-fit and/or force-fit manner.

9. The supply device of claim 8, wherein the base table (22) is substantially plate-shaped and comprises at least one receptacle (65) for receiving at least one attachment device (57) formed on each of the guiding devices (20).

10. A supply device for feeding of goods to be transported to a conveyor device, comprising:
at least one conveyor belt (9) that extends around two deflection pulleys (4) of the supply device, the at least one conveyor belt (9) has an inner side (21) with a guide strip (23) approximately arranged along a feed direction (13), and
a bed (11) having a guide groove (19) receiving the guide strip (23) for guiding the at least one conveyor belt (9) between the two deflection pulleys (4), the bed (11) having a base table (22) and at least one guiding device (20) attached to the base table (22), the at least one guiding device (20) being an essentially U-shaped profile element (51), wherein the guide groove (19) is formed on a central web (53) of the essentially U-shaped profile element (51), or is at least partially formed on a flange (55) of the essentially U-shaped profile element (51) and is oriented approximately along the feed direction (13).

11. The supply device of claim 10, wherein the essentially U-shaped profile element (51) of the at least one guiding device (20) defines an inverted U-shape with a central web (53) and two flanges (55) projecting down from opposite sides of the central web (53), each of the flanges (55) of the essentially U-shaped profile element (51) having a free end remote from the central web (53) and forming a foot member (59) that is attached directly to the base table (22).

12. The supply device of claim 11, wherein the at least one guiding device (20) comprises at least first and second guiding devices (20) arranged along the feed direction (13), the guide groove (19) being defined by one of the flanges (55) of the first guiding device (20) and one of the flanges (55) of the second guiding device (20).

13. The supply device of claim 11, wherein the guide groove (19) is formed in the central web (53) at a position spaced inward from the flanges (55) of the essentially U-shaped profile element (51).

14. The supply device of claim 11, wherein the base table (22) has opposite upper and lower surfaces, the upper surface of the base table (22) facing toward the central web (53) of the U-shaped profile element (51) of the at least one guiding device (20), the foot member (59) of each of the flanges (55) of the U-shaped profile element (51) is engaged with the lower surface of the base table (22).

15. The supply device of claim 12, wherein the central web (53) is substantially planar.

16. A supply device the for feeding of goods to be transported to a conveyor device, comprising:
at least one conveyor belt (9) that extends around two deflection pulleys (4) of the supply device, the at least one conveyor belt (9) has an inner side (21) with a guide strip (23) approximately arranged along a feed direction (13), and
a bed (11) having a guide groove (19) receiving the guide strip (23) for guiding the at least one conveyor belt (9) between the two deflection pulleys (4), wherein:
the bed (11) comprises a base table (22) and at least two guiding devices (20) attached to the base table (22), the at least two guiding devices (20) being arranged approximately parallel to one another on the base table (22) and being spaced from one another so that the guide groove (19) is formed by a spacing between the at least two guiding devices (20), the spacing being oriented approximately perpendicular to the feed direction (13) so that the guide groove (19) is oriented approximately along the feed direction (13); and
each of the at least two guiding devices (20) is formed from a cold-rolled and/or cold-formed steel.

17. The supply device of claim 16, wherein each of the at least two guiding devices (20) is an essentially U-shaped profile element.

18. The supply device of claim 17, wherein the essentially U-shaped profile element (51) of the at least one guiding device (20) defines an inverted U-shape with a central web (53) and two flanges (55) projecting down from opposite sides of the central web (53), each of the flanges (55) of the essentially U-shaped profile element (51) having a free end remote from the central web (53) and forming a foot member (59) that is attached directly to the base table (22).

19. The supply device of claim 18, wherein the at least one guiding device (20) comprises at least first and second guiding devices (20) arranged along the feed direction (13), the guide groove (19) being defined by one of the flanges (55) of the first guiding device (20) and one of the flanges (55) of the second guiding device (20).

20. The supply device of claim 16, wherein the base table (22) is substantially plate-shaped and comprises at least one receptacle (65) for receiving at least one attachment device (57) formed on each of the guiding devices (20).

* * * * *